United States Patent
Hart et al.

(10) Patent No.: US 12,331,462 B2
(45) Date of Patent: Jun. 17, 2025

(54) METHOD FOR MANUFACTURING BLEACHED PULP FROM A FEEDSTOCK COMPRISING RECYCLED PAPER

(71) Applicant: WESTROCK MWV, LLC, Atlanta, GA (US)

(72) Inventors: Peter W. Hart, Atlanta, GA (US); John D. Dejarnette, Henrico, VA (US); Fritz G. Paulsen, Summerville, SC (US); Ashok K. Ghosh, Henrico, VA (US)

(73) Assignee: WestRock MWV, LLC, Atlanta, GA (US)

( * ) Notice: Subject to any disclaimer, the term of this patent is extended or adjusted under 35 U.S.C. 154(b) by 141 days.

(21) Appl. No.: 17/791,862

(22) PCT Filed: Dec. 9, 2020

(86) PCT No.: PCT/US2020/063920
§ 371 (c)(1),
(2) Date: Jul. 8, 2022

(87) PCT Pub. No.: WO2021/141712
PCT Pub. Date: Jul. 15, 2021

(65) Prior Publication Data
US 2023/0073443 A1     Mar. 9, 2023

Related U.S. Application Data

(60) Provisional application No. 62/958,886, filed on Jan. 9, 2020.

(51) Int. Cl.
*D21C 5/02*     (2006.01)
*D21B 1/06*     (2006.01)
(Continued)

(52) U.S. Cl.
CPC .............. *D21C 5/022* (2013.01); *D21B 1/061* (2013.01); *D21C 1/10* (2013.01); *D21C 3/02* (2013.01);
(Continued)

(58) Field of Classification Search
CPC .......... D21C 5/022; D21C 1/10; D21H 11/14; Y02W 30/64
See application file for complete search history.

(56) References Cited

U.S. PATENT DOCUMENTS 3,963,560 A * 6/1976 Mestetsky .............. D21C 5/027
162/8
5,147,503 A * 9/1992 Nguyen ................... D21C 5/02
162/7
(Continued)

FOREIGN PATENT DOCUMENTS

EP     0566284 A2     10/1993
EP     0967320 A1     12/1999
(Continued)

OTHER PUBLICATIONS

Chaz Miller, Profiles in Garbage: Corrugated Boxes, 2001 [downloaded online Apr. 15, 2024], Waste 360. (Year: 2001).*
ISRI scrap Circular, 208, ISRI. (Year: 2018).*

*Primary Examiner* — Anthony Calandra
(74) *Attorney, Agent, or Firm* — Neil G. Cohen; Rohini K. Garg

(57) ABSTRACT

A method for manufacturing bleached pulp from a feedstock that includes recycled paper. The method includes steps of: (1) impregnating the feedstock with cooking liquor to yield an impregnated material having a liquor-to-fiber mass ratio of at most about 4:1; (2) cooking the impregnated material
(Continued)

to remove at least a portion of the lignin within the impregnated material, thereby yielding a cooked pulp; and (3) bleaching the cooked pulp.

20 Claims, 2 Drawing Sheets

(51) Int. Cl.
*D21C 1/10* (2006.01)
*D21C 3/02* (2006.01)
*D21C 7/00* (2006.01)
*D21C 9/02* (2006.01)
*D21C 9/10* (2006.01)
*D21H 11/14* (2006.01)

(52) U.S. Cl.
CPC ............... *D21C 7/00* (2013.01); *D21C 9/02* (2013.01); *D21C 9/10* (2013.01); *D21H 11/14* (2013.01)

(56) References Cited

U.S. PATENT DOCUMENTS

| | | | |
|---|---|---|---|
| 6,017,415 A * | 1/2000 | Phillips | D21C 3/00 |
| | | | 162/147 |
| 11,486,094 B2 * | 11/2022 | Sixta | D21C 11/00 |
| 2004/0256065 A1 | 12/2004 | Aziz et al. | |
| 2011/0120663 A1 | 5/2011 | Johan et al. | |
| 2015/0225901 A1 * | 8/2015 | Asikainen | D21H 11/14 |
| | | | 162/14 |

FOREIGN PATENT DOCUMENTS

| | | | | |
|---|---|---|---|---|
| WO | 1997032075 A1 | 9/1997 | | |
| WO | 199907935 A1 | 2/1999 | | |
| WO | 200052256 A1 | 9/2000 | | |
| WO | WO-0175220 A1 * | 10/2001 | ........... | D21C 9/1036 |
| WO | 2016145276 A1 | 9/2016 | | |
| WO | 2017203329 A1 | 11/2017 | | |

* cited by examiner

METHOD FOR MANUFACTURING BLEACHED PULP FROM A FEEDSTOCK COMPRISING RECYCLED PAPER

CROSS-REFERENCE TO RELATED APPLICATIONS

The present application is a 35 U.S.C. § 371 national stage application of PCT/US2020/063920 filed on Dec. 9, 2020, which claims the benefit of priority to U.S. Provisional Patent Application Ser. No. 62/958,886 filed on Jan. 9, 2020, the entire contents of each which are incorporated herein by reference in their entirety.

FIELD

This patent application relates to the manufacture of bleached pulp and, more particularly, to the use of recycled paper having a high lignin content in the manufacture of bleached pulp.

BACKGROUND

Bleached kraft pulp is used to manufacture various paper and paperboard products, which are used in a wide variety of applications. For example, paperboard manufactured from bleached kraft pulp is commonly used for various packaging applications, such as packaging for food (e.g., cartons) and packaging for beverages (e.g., cups).

A substantial portion of the paper and paperboard coming from today's paper mills is manufactured using virgin pulp. However, consumers have a growing interest in paper and paperboard products manufactured from recycled pulp.

Accordingly, those skilled in the art continue with research and development efforts in the field of bleached pulp manufacture.

SUMMARY

Disclosed are various methods for manufacturing bleached pulp from a feedstock comprising recycled paper, such as old corrugated containers. The recycled paper includes both lignin and cellulose.

In one example, the disclosed method for manufacturing bleached pulp from a feedstock comprising recycled paper includes steps of: (1) impregnating the feedstock with cooking liquor to yield an impregnated material having a liquor-to-fiber mass ratio of at most about 4:1; (2) cooking the impregnated material to remove at least a portion of the lignin within the impregnated material, thereby yielding a cooked pulp; and (3) bleaching the cooked pulp.

In another example, the disclosed method for manufacturing bleached pulp from a feedstock comprising recycled paper includes steps of: (1) processing the feedstock with at least one of a hogger, a cutter and a slicer to yield reduced size feedstock; (2) impregnating the reduced size feedstock with cooking liquor comprising sodium hydroxide, sodium sulfide, and water to yield an impregnated material having a liquor-to-fiber mass ratio of at most about 3:1, wherein impregnating the reduced size feedstock comprises compressing the reduced size feedstock to achieve a compression ratio of at least 2:1, on a volume basis; (3) cooking the impregnated material to a kappa number of at most about 35 to yield a cooked pulp; (4) blending the cooked pulp with virgin pulp to yield a pulp blend; and (5) bleaching the pulp blend to a GE brightness of at least about 80 percent.

Other examples of the disclosed method for manufacturing bleached pulp will become apparent from the following detailed description, the accompanying drawings, and the appended claims.

DETAILED DESCRIPTION

Disclosed are various methods for manufacturing bleached pulp from a feedstock 10 (FIG. 1) comprising recycled paper. As used herein, the term "paper" broadly refers to any material formed from pressed/laid fibers of cellulosic pulp and includes paperboard.

Figure 1:
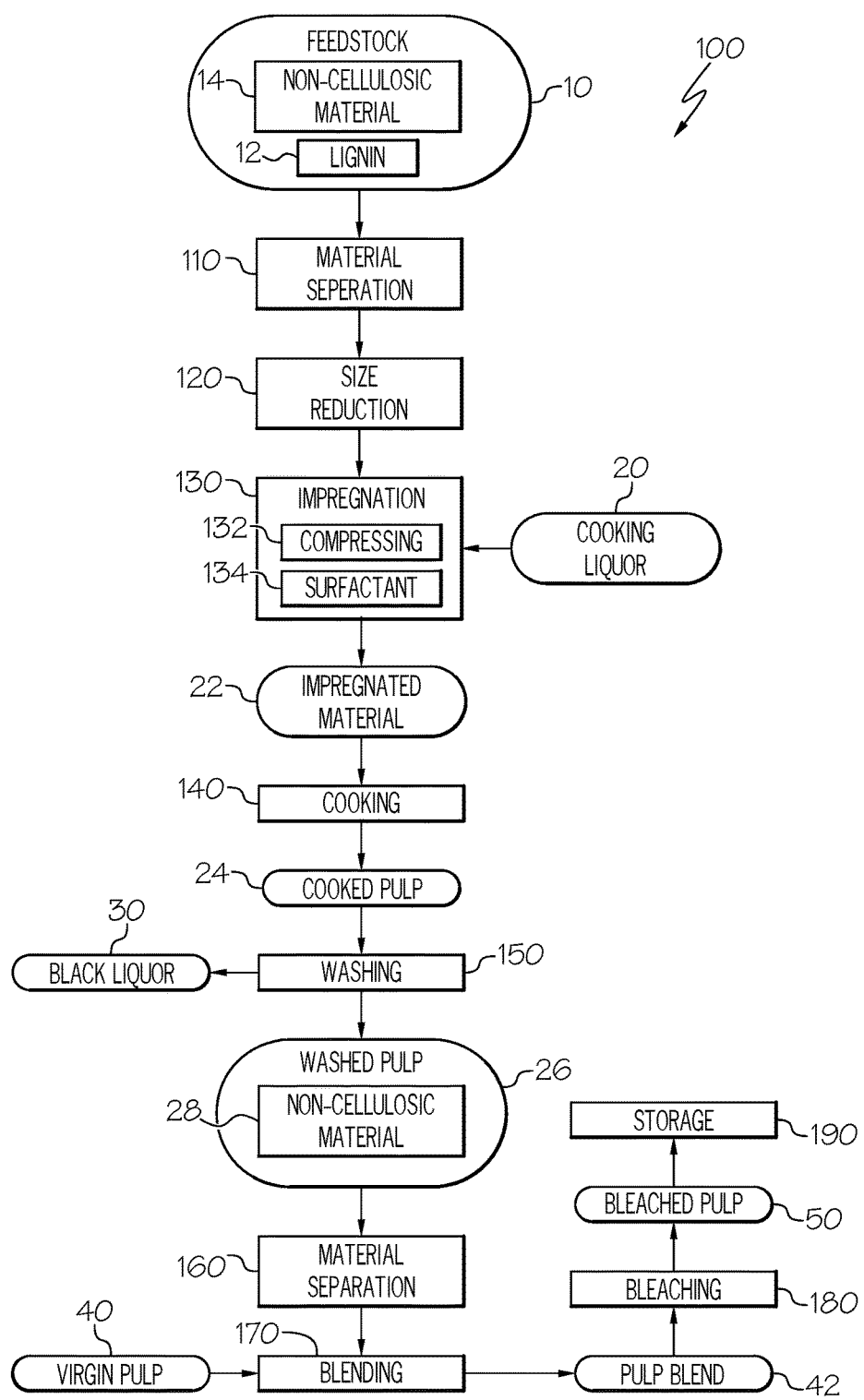
FIG. 1 is a flow diagram depicting one example of the disclosed method for manufacturing bleached pulp from a feedstock comprising recycled paper.

Feedstocks 10 (FIG. 1) useful in the disclosed methods may have a relatively high quantity of lignin 12 (FIG. 1). In one expression, a feedstock useful in the disclosed methods may have, on average, a kappa number of at least 60. In another expression, a feedstock useful in the disclosed methods may have, on average, a kappa number of at least 70. In another expression, a feedstock useful in the disclosed methods may have, on average, a kappa number of at least 80. In another expression, a feedstock useful in the disclosed methods may have, on average, a kappa number of at least 90. In yet another expression, a feedstock useful in the disclosed methods may have, on average, a kappa number of at least 100.

Various types of feedstocks 10 (FIG. 1) may be used without departing from the scope of the present disclosure. In one specific, non-limiting example, a suitable feedstock for the disclosed methods may be (or may include) old corrugated containers (OCC), which may be received in bulk (e.g., bales). Other non-limiting examples of suitable feedstock for the disclosed methods include corrugated box plant clippings, kraft bagging, newsprint, and recovered kraft fibers, double liner kraft (DLK), and paper mill broke (trim rolls or rejected quality rolls). Those skilled in the art will appreciate that a feedstock comprised of a mixture of different types of recycled papers (e.g., old corrugated containers and double liner kraft) may be used.

Those skilled in the art will appreciate that the feedstock 10 (FIG. 1) may contain water, and that the quantity of water in the feedstock may be due to the equilibrium moisture content or may be greater than the equilibrium moisture content. In one expression, the feedstock may have a solids content of at least 70 percent by weight. In another expression, the feedstock may have a solids content of at least 75 percent by weight. In another expression, the feedstock may have a solids content of at least 80 percent by weight. In another expression, the feedstock may have a solids content of at least 85 percent by weight. In another expression, the feedstock may have a solids content of at least 90 percent by weight. In yet another expression, the feedstock may have a solids content of at least 95 percent by weight.

Illustrated in FIG. 1 is one example of the disclosed method, generally designated 100, for manufacturing bleached pulp 50 from a feedstock 10 comprising recycled paper. As noted herein, the feedstock may have a relatively high quantity of lignin 12, at least a portion of which is removed by the method 100.

At Block 110, the method 100 may include the step of separating from the feedstock 10 at least a portion of any non-cellulosic material 14 contained therein. Various non-cellulosic materials 14, such as plastics, metallic materials, rocks, debris, and the like, may be present in the feedstock 10, whether intentionally or unintentionally. The material separation step (Block 110) may ensure that non-cellulosic materials 14—particularly non-cellulosic materials 14 that can damage equipment used in the impregnation step (Block 130)—do not reach the impregnation step (Block 130). The non-cellulosic materials 14 separated from the feedstock 10 may be sent to trash, burned or the like.

At Block 120, the method 100 may include the step of reducing the size of the feedstock 10. The size reduction step (Block 120) may be performed after the material separation step (Block 110) but before the impregnation step (Block 130), though variations are contemplated and will not result in a departure from the scope of the present disclosure.

Various techniques may be used for reducing the size of (e.g., shredding) the feedstock 10. As one non-limiting example, a hogger may be used to perform the size reduction step (Block 120). As another non-limiting example, a cutter may be used to perform the size reduction step (Block 120). As yet another non-limiting example, a slicer may be used to perform the size reduction step (Block 120).

At Block 130, the method 100 includes the step of impregnating the feedstock 10 with cooking liquor 20. In one particular implementation, the cooking liquor 20 may be a kraft cooking liquor, and may include sodium hydroxide (NaOH), sodium sulfide ($Na_2S$) and water ($H_2O$), among other possible components. The use of other types of cooking chemistries (soda, sulfite, green liquor, and carbonate) is also contemplated and will not result in a departure from the scope of the present disclosure.

The impregnation step (Block 130) yields a uniformly impregnated material 22 having a liquor-to-fiber mass ratio. In one expression, the liquor-to-fiber mass ratio may be at most about 4:1. In another expression, the liquor-to-fiber mass ratio may be at most about 3:1. In another expression, the liquor-to-fiber mass ratio may be less than 3:1. In another expression, the liquor-to-fiber mass ratio may be at most about 2.5:1. In another expression, the liquor-to-fiber mass ratio may be at most about 2:1. In yet another expression, the liquor-to-fiber mass ratio may range from about 1:1 to about 3:1.

The cooking liquor 20 used in the impregnation step (Block 130) may contain a percentage of active alkali ions. In one expression, the percentage of active alkali ions may be about 5 percent by weight of the feedstock 10 to about 10 percent by weight of the feedstock 10. In another expression, the percentage of active alkali ions may be about 5 percent by weight of the feedstock to about 15 percent by weight of the feedstock. In another expression, the percentage of active alkali ions may be about 5 percent by weight of the feedstock to about 20 percent by weight of the feedstock. In yet another expression, the percentage of active alkali ions may be about 5 percent by weight of the feedstock to about 25 percent by weight of the feedstock.

As shown in Block 132, the impregnation step (Block 130) may include the step of compressing the feedstock 10. Without being limited to any particular theory, it is believed that compressing the feedstock 10 aids in the impregnation step (Block 130) and facilitates a more uniform distribution of the cooking liquor 20 throughout the impregnated material 22.

Various techniques may be used to perform the compressing step (Block 132). As one specific, non-limiting example, the compressing step (Block 132) may be performed by a plug/compression screw feeder, such as an MSD Impressafiner®, which is commercially available from Andritz AG of Graz, Austria. As another non-limiting example, the compressing step (Block 132) may be performed by a screw press. As yet another non-limiting example, the compressing step (Block 132) may be performed by a kneader. The use of multiple different apparatus (e.g., in series and/or in parallel) for performing the compressing step (Block 132) is also contemplated.

The compressing step (Block 132) may be performed on the feedstock 10 to achieve a desired compression ratio. In one expression, the compressing step (Block 132) may be performed to achieve a compression ratio greater than 1:1, on a volume basis. In another expression, the compressing step (Block 132) may be performed to achieve a compression ratio of at least about 1.5:1, on a volume basis. In another expression, the compressing step (Block 132) may be performed to achieve a compression ratio of at least about 2:1, on a volume basis. In another expression, the compressing step (Block 132) may be performed to achieve a compression ratio of at least about 2.5:1, on a volume basis. In another expression, the compressing step (Block 132) may be performed to achieve a compression ratio of at least about 3:1, on a volume basis. In another expression, the compressing step (Block 132) may be performed to achieve a compression ratio of at least about 3.5:1, on a volume basis. In another expression, the compressing step (Block 132) may be performed to achieve a compression ratio of at least about 4:1, on a volume basis. In yet another expression, the compressing step (Block 132) may be performed to achieve a compression ratio between about 2:1 and about 4:1, on a volume basis.

As shown in Block 134, the impregnation step (Block 130) may further include the step of adding a surfactant to the feedstock 10. Without being limited to any particular theory, the addition of surfactant may aid in the penetration of cooking liquor 20 into sized materials.

At Block 140, the method 100 includes the step of cooking the impregnated material 22 to yield a cooked pulp 24. The cooking step (Block 140) may be performed in a continuous digester, such as a Pandia-type digester, a Messig & Durkee (M&D-type) digester, a Kamyr-type digester, or the like. However, the use of a batch digester (or both a batch digester and a continuous digester) is also contemplated.

The cooking step (Block 140) may remove at least a portion of the lignin 12 from the impregnated material 22. In one expression, the cooking step (Block 140) may be performed to a kappa number of at most about 40. In another expression, the cooking step (Block 140) may be performed to a kappa number of at most about 35. In another expression, the cooking step (Block 140) may be performed to a kappa number of at most about 33. In another expression, the cooking step (Block 140) may be performed to a kappa number of at most about 30. In yet another expression, the cooking step (Block 140) may be performed to a kappa number ranging from about 15 to about 40. In yet another expression, the cooking step (Block 140) may be performed to a kappa number ranging from about 24 to about 32.

The cooking step (Block 140) may be performed at a cooking temperature and the impregnated material 22 may have a residence time at the cooking temperature. Those skilled in the art will appreciate that the cooking temperature and the residence time may depend on various factors, such as the chemistry of the cooking liquor 20 and the liquor-to-fiber mass ratio of the impregnated material 22. For example, when the cooking liquor 20 is a kraft cooking liquor, the cooking temperature may range from about 150° C. and about 170° C., and the residence time may range from about 30 minutes to about 90 minutes at the cooking temperature.

Because of the relatively low liquor-to-fiber mass ratio of the impregnated material 22, those skilled in the art will appreciate that the cooking step (Block 140) may be referred to as vapor-phase digestion.

At Block 150, the method 100 may include the step of washing the cooked pulp 24 to yield washed pulp 26 and black liquor 30. The washing step (Block 150) may be performed with water or an aqueous solution, as is well known in the art. The black liquor 30 may be collected and further processed to produce cooking liquor 20.

At Block 160, the method 100 may include the step of separating from the washed pulp 26 at least a portion of any non-cellulosic material 28 contained therein. Various non-cellulosic materials 28, such as plastics, metallic materials, rocks, debris, and the like, may be present in the washed pulp 26. The non-cellulosic materials 28 separated from the washed pulp 26 may be sent to trash, burned or the like.

At Block 170, the method 100 may optionally include the step of blending the cooked pulp 24 (or washed pulp 26, if washed first) with virgin pulp 40 (i.e., pulp not obtained by recycling) to yield a pulp blend 42. The blending step (Block 170) may be performed prior to the bleaching step (Block 180), though variations (e.g., blending after bleaching) are also contemplated.

The pulp blend 42 may contain various quantities of virgin pulp 40 without departing from the scope of the present disclosure. In one non-limiting example, the pulp blend 42 includes about 5 percent by weight to about 95 percent by weight cooked pulp 24 (or washed pulp 26, if washed first), with balance virgin pulp 40. In another non-limiting example, the pulp blend 42 includes about 5 percent by weight to about 85 percent by weight cooked pulp 24 (or washed pulp 26, if washed first), with balance virgin pulp 40. In another non-limiting example, the pulp blend 42 includes about 5 percent by weight to about 75 percent by weight cooked pulp 24 (or washed pulp 26, if washed first), with balance virgin pulp 40. In another non-limiting example, the pulp blend 42 includes about 5 percent by weight to about 65 percent by weight cooked pulp 24 (or washed pulp 26, if washed first), with balance virgin pulp 40. In another non-limiting example, the pulp blend 42 includes about 5 percent by weight to about 50 percent by weight cooked pulp 24 (or washed pulp 26, if washed first), with balance virgin pulp 40. In yet another non-limiting example, the pulp blend 42 includes about 10 percent by weight to about 30 percent by weight cooked pulp 24 (or washed pulp 26, if washed first), with balance virgin pulp 40.

At Block 180, the method 100 includes the step of bleaching the cooked pulp 24 (or the washed pulp 26, if washed, or the pulp blend 42, if blended) to yield bleached pulp 50. The bleaching step (Block 180) increases the brightness of the pulp. In one expression, the bleaching step (Block 180) is performed to achieve a GE brightness of at least about 70 percent. In another expression, the bleaching step (Block 180) is performed to achieve a GE brightness of at least about 75 percent. In another expression, the bleaching step (Block 180) is performed to achieve a GE brightness of at least about 80 percent. In another expression, the bleaching step (Block 180) is performed to achieve a GE brightness of at least about 85 percent. In yet another expression, the bleaching step (Block 180) is performed to achieve a GE brightness of at least about 90 percent.

Various bleaching techniques may be used for the bleaching step (Block 180). As one non-limiting example, the bleaching step (Block 180) includes traditional chlorine bleaching. As another non-limiting example, the bleaching step (Block 180) includes chlorine dioxide bleaching. As another non-limiting example, the bleaching step (Block 180) includes peroxide bleaching. As another non-limiting example, the bleaching step (Block 180) includes oxygen bleaching.

At Block 190, the method 100 may include the step of storing the bleached pulp 50 in a storage vessel. For example, the storing step (Block 190) may include storing the bleached pulp in a high-density storage tank. After storing (or as an alternative to storing), the bleached pulp 50 may be used to manufacture various articles (e.g., paperboard; cups containing paperboard; etc.).

Accordingly, the method 100 may produce bleached pulp 50, which may be used in a variety of applications, such as for manufacturing paper and paperboard.

Figure 2:
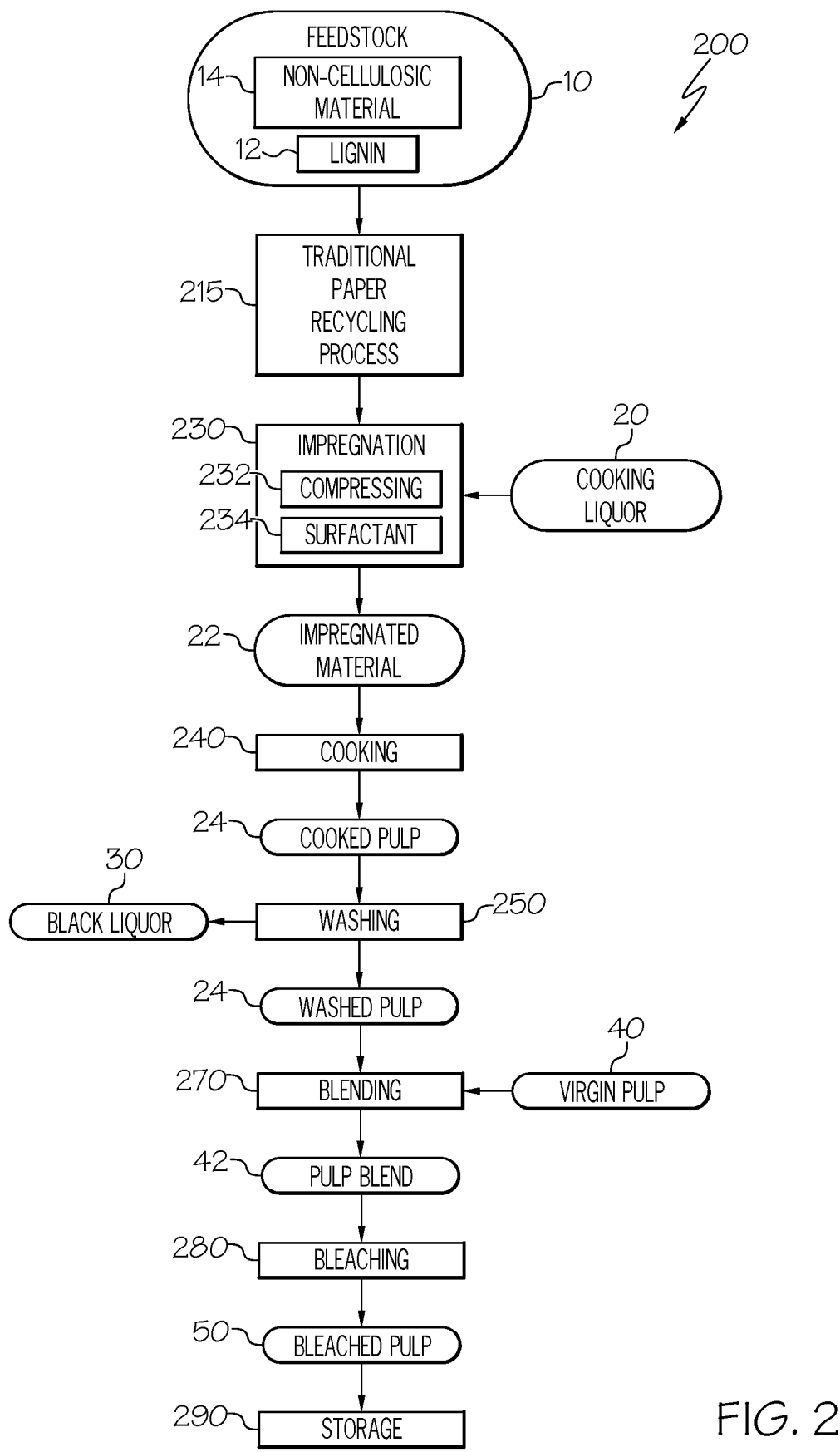
FIG. 2 is a flow diagram depicting another example of the disclosed method for manufacturing bleached pulp from a feedstock comprising recycled paper.

Illustrated in FIG. 2 is another example of the disclosed method, generally designated 200, for manufacturing bleached pulp 50 from a feedstock 10 comprising recycled paper.

At Block 215, the method 200 includes the step of processing the feedstock 10 using a traditional paper recycling process prior to the impregnation step (Block 230). For example, at Block 215, the feedstock 10 may be processed using a traditional old corrugated container recycling process to yield free fibers.

At Block 230, the method 200 includes the step of impregnating the feedstock 10 with cooking liquor 20 to yield a uniformly impregnated material 22. The impregnation step (Block 230) of method 200 may be the same as or substantially similar to the impregnation step (Block 130) of method 100, and may include a compressing step (Block 232) and an adding surfactant step (Block 234).

At Block 240, the method 200 includes the step of cooking the impregnated material 22 to yield a cooked pulp 24. The cooking step (Block 240) of method 200 may be the same as or substantially similar to the cooking step (Block 140) of method 100.

At Block 250, the method 200 may include the step of washing the cooked pulp 24 to yield washed pulp 26 and black liquor 30. The cooking step (Block 250) of method 200 may be the same as or substantially similar to the cooking step (Block 150) of method 100.

At Block 270, the method 200 may include the step of blending the cooked pulp 24 (or the washed pulp 26, if washed) with virgin pulp 40 to yield a pulp blend 42. The blending step (Block 270) of method 200 may be the same as or substantially similar to the blending step (Block 170) of method 100.

At Block 280, the method 200 includes the step of bleaching the cooked pulp 24 (or the washed pulp 26, if washed, or the pulp blend 42, if blended) to yield bleached pulp 50. The bleaching step (Block 280) of method 200 may be the same as or substantially similar to the bleaching step (Block 180) of method 100.

At Block 290, the method 200 may include the step of storing the bleached pulp 50 in a storage vessel.

EXAMPLE

A pilot level example is provided using a scrap corrugated board from a North American box plant that uses both post-consumer (recycled) paperboard and pre-consumer paperboard. Single wall combined board scrap at equilibrium moisture of about 8 to 10% moisture content was shredded to produce a dry feed material for a commercially available MSD Impressafiner® from Andritz. A kraft cooking liquor was prepared from NaOH and Na$_2$S solutions close to commercial total titratable alkali (TTA) levels. Using the novel dry uptake process to improve cooking liquor penetration and cooking liquor uptake from the dry fiber compression at the fiber expansion of the MSD press, a very uniform distribution of cooking liquor was achieved.

The new cooking process preparation and digestion of recovered fibers provides for more uniform cooking parameters through better distribution of cooking liquors before higher cooking temperatures are applied. The new method was verified in this example demonstrating the expansion and elevated cooking liquor uptake of dry fiber from the press to allow for adequate cooking liquor charges on an oven dried basis. Cooking liquors used were at commercially achievable total titratable alkali levels for a kraft mill. Taking advantage of the demonstrated cooking liquor uptake, it was determined that tuning the required charge of cooking liquor (on an oven dried fiber basis) could be achieved with appropriate bulking liquors and/or water, thereby precisely controlling the ultimate alkali added to the feedstock (on an oven dried fiber basis). This allowed for uniform cooking to the desired cooked lignin content or kappa number target suitable for bleaching.

Once the shredded, pre-impregnated corrugated board was prepared, levels of applied liquor were such that no free liquor remained in the digester fiber charge. No further cooking liquor had to be added at the digester. A vapor phase cook was conducted without a heavy hydraulic load. In this example, a liquor to wood ratio to the digester was recorded at 2.5:1, including feedstock moisture and added process steam during the pressing prior to the digestion process.

Pre-impregnated feedstock was fed to a pilot sized Pandia digester at about 5.6 oven dried metric tons per day of continuous production having a saturated steam pressure of 100 psi (170 deg Celsius.). Screw speed was set to deliver a cooking h-factor of about 386. The h-factor is an integration of cook temperature over time. This digester screw speed delivered a kappa number of 28.6 starting from the original feedstock kappa of about 86.5. Kappa number is an inferred measure of pulp residual lignin content through a permanganate oxidation reaction residual determination using TAPPI standard T236. The 28.6 kappa experimental pulp represents a commercially acceptable bleachable grade softwood kraft cook.

After digestion, a water washing stage to remove the residual cooking liquor was completed. Then a three stage D(EP)D bleaching sequence was used. The experimental fiber reached 83.3 final ISO brightness bleached in parallel with a commercially available kraft virgin pine pulp which was produced under the same laboratory bleaching conditions producing 81.3 ISO brightness.

After bleaching, a standard fiber development evaluation was conducted using a valley beater per TAPPI standard T200. Fiber development to a similar drainage level of about 500 ml as measured by a Canadian Standard Freeness test for the experimental bleached recycled fiber was found to be very similar with slight strength improvements to that of a commercially available bleached recycled market pulp shown in the table. A virgin kraft bleached softwood pulp is included in Table 1, below, for reference. Bleached recovered pulps typically yield lower strength due to the recycling with typical fiber shortening and the once dried influence which reduces typical hydrogen bonding properties.

TABLE 1

Bleached Fiber Tests 124 gsm Handsheets

| Sample refined to 500 CSF Drainage | Length Weighted Fiber Length (mm) | ISO Brightness | Young's Modulus (Gpa) | Tensile Stiffness Index (kNm/g) | Tensile Index (Nm/g) | Tear Index (mN-m$^2$/g) |
|---|---|---|---|---|---|---|
| Virgin Pine Pulp | 2.19 | 81.3 | 11.2 | 6.2 | 84 | 13.4 |
| Recycled Market Pulp | 0.98 | 83.2 | 4.1 | 3.1 | 29 | 7.5 |
| Experimental Pulp | 1.29 | 83.3 | 4.9 | 3.4 | 33 | 10.6 |

CSF measured by TAPPI T227
Fiber length determined optically with commercial OpTest hardware
Handsheets made per TAPPI T205
Strength testing per TAPPI T220
Brightness per TAPPI T218

Although various examples of the disclosed method for manufacturing bleached pulp have been shown and described, modifications may occur to those skilled in the art upon reading the specification. The present application includes such modifications and is limited only by the scope of the claims.

What is claimed is:

1. A method for manufacturing bleached pulp from a feedstock comprising recycled paper, the recycled paper comprising lignin and cellulose, the method comprising:
   impregnating the feedstock with cooking liquor to yield an impregnated material having a liquor-to-fiber mass ratio of at most about 4:1, wherein the impregnating the feedstock comprises compressing the feedstock, wherein the compressing the feedstock achieves a compression ratio greater than 1:1, on a volume basis;
   determining a cooking liquor uptake of the feedstock at the compression ratio achieved during the impregnating; and
   tuning a charge of the cooking liquor added to the feedstock during the impregnating based on the cooking liquor uptake of the feedstock and a concentration of the cooking liquor;
   cooking the impregnated material to remove at least a portion of the lignin from the impregnated material, thereby yielding a cooked pulp; and
   bleaching the cooked pulp.

2. A method for manufacturing bleached pulp, the method comprising:
   providing a feedstock comprising recycled paper, the recycled paper comprising lignin and cellulose, wherein the feedstock has a solids content of at least 70 percent by weight;
   compressing the feedstock having the solids content of at least 70 percent by weight, thereby yielding a compressed feedstock;
   impregnating the compressed feedstock with cooking liquor to yield an impregnated material having a liquor-to-fiber mass ratio of at most about 4:1;
   feeding the impregnated material having the liquor-to-fiber mass ratio of at most about 4:1 to a digester;
   cooking the impregnated material having the liquor-to-fiber mass ratio of at most about 4:1 to remove at least a portion of the lignin from the impregnated material, thereby yielding a cooked pulp; and
   bleaching the cooked pulp.

3. The method of claim 2 wherein the feedstock has a solids content of at least 75 percent by weight.

4. The method of claim 2 wherein the feedstock has a kappa number of at least about 80.

5. The method of claim 2 wherein the feedstock comprises old corrugated containers.

6. The method of claim 2 wherein the compressing the feedstock achieves a compression ratio greater than 1.5:1, on a volume basis.

7. The method of claim 2 wherein the liquor-to-fiber mass ratio of the impregnated material is at most about 3:1.

8. The method of claim 2 wherein the liquor-to-fiber mass ratio of the impregnated material is at most about 2.5:1.

9. The method of claim 2 wherein the impregnating the compressed feedstock comprises adding a surfactant to the feedstock.

10. The method of claim 2 wherein the cooking liquor comprises sodium hydroxide, sodium sulfide, and water.

11. The method of claim 2 wherein the cooking the impregnated material is performed at a cooking temperature between about 150° C. and about 170° C.

12. The method of claim 11 wherein the impregnated material has a residence time of about 30 minutes to about 90 minutes at the cooking temperature.

13. The method of claim 2 wherein the cooking the impregnated material is performed to a kappa number of at most about 35.

14. The method of claim 2 wherein the cooking the impregnated material is performed in a continuous digester.

15. The method of claim 2 further comprising blending the cooked pulp with virgin pulp to yield a pulp blend prior to the bleaching.

16. The method of claim 15 wherein the cooked pulp comprises about 10 percent by weight to about 30 percent by weight of the pulp blend.

17. The method of claim 15 wherein bleaching the cooked pulp comprises bleaching the pulp blend to a GE brightness of at least about 80 percent.

18. A method for manufacturing bleached pulp, the method comprising:
providing a feedstock comprising recycled paper, the recycled paper comprising lignin and cellulose, wherein the feedstock has a solids content of at least 70 percent by weight;
compressing the feedstock having the solids content of at least 70 percent by weight, thereby yielding a compressed feedstock;
impregnating the compressed feedstock having the solids content of at least 70 percent by weight, thereby yielding an impregnated material having a liquor-to-fiber mass ratio of at most about 2.5:1;
feeding the impregnated material having the liquor-to-fiber mass ratio of at most about 2.5:1 to a digester;
cooking the impregnated material having the liquor-to-fiber mass ratio of at most about 2.5:1 to remove at least a portion of the lignin from the impregnated material, thereby yielding a cooked pulp; and
bleaching the cooked pulp.

19. The method of claim 18 wherein the feedstock has a solids content of at least 75 percent by weight.

20. The method of claim 18 wherein the feedstock has a solids content of at least 80 percent by weight.

* * * * *